April 21, 1959 P. A. SAUNDERS 2,883,030
BALED HAY LOADING AND UNLOADING ATTACHMENT
Filed Feb. 21, 1955 2 Sheets-Sheet 1
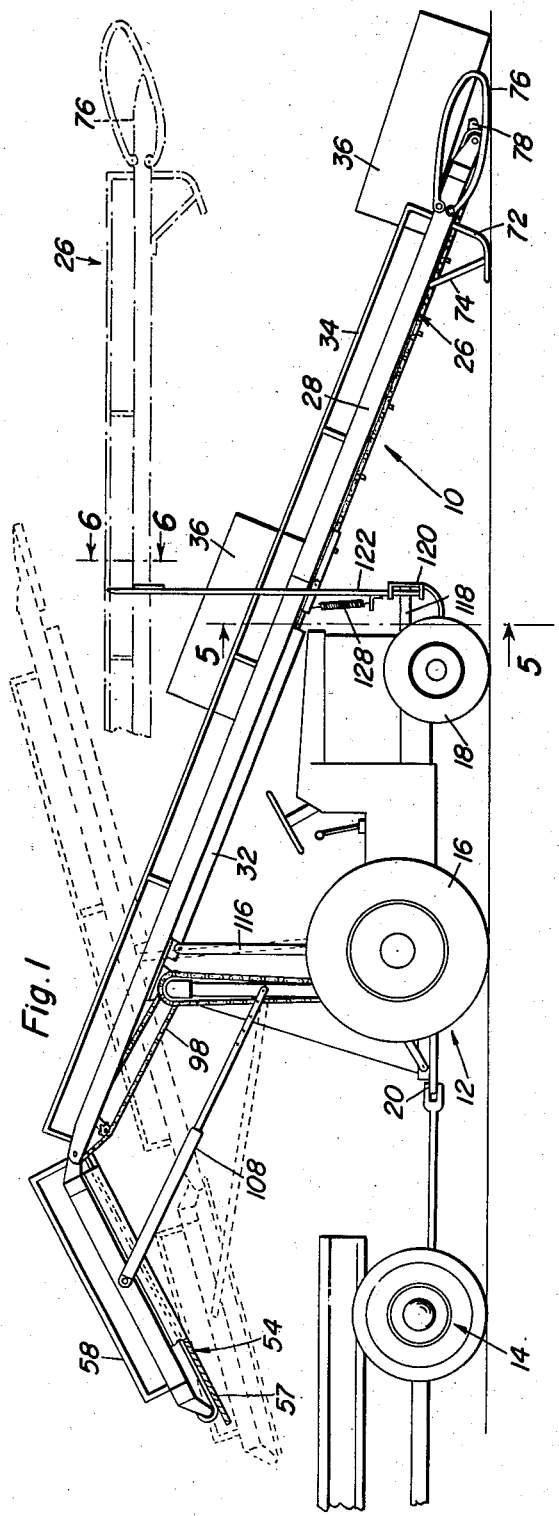
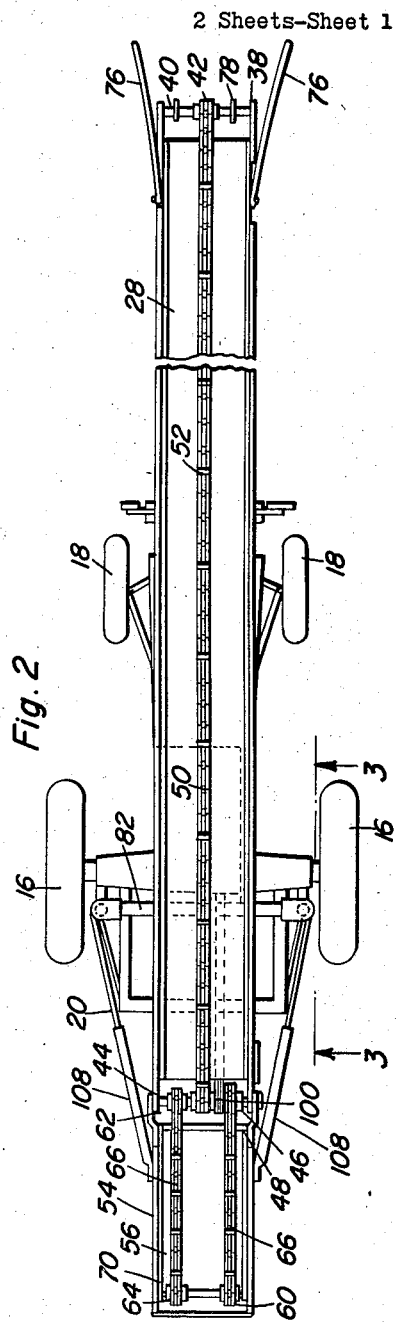
Percy A. Saunders
INVENTOR.

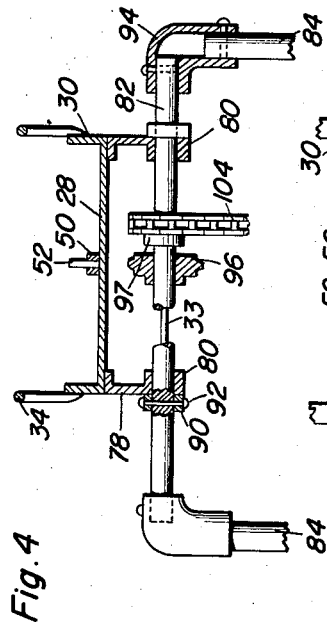

United States Patent Office 2,883,030
Patented Apr. 21, 1959

2,883,030

BALED HAY LOADING AND UNLOADING ATTACHMENT

Percy A. Saunders, Kenbridge, Va., assignor of fifty percent to W. Roland Walker, Kenbridge, Va.

Application February 21, 1955, Serial No. 489,340

3 Claims. (Cl. 198—7)

This invention generally relates to a loading and unloading attachment for tractors that is especially adapted for loading hay bales into a wagon or similar vehicle pulled behind the tractor and then transported to a place of storage and unloaded into a barn loft or any other storage area.

After the development of balers that gather the hay from the field, bale it and then discharge the baled hay onto the field, a need has arisen for the provision of a device for picking up and loading these bales onto a suitable carrier since hand loading the bales is relatively slow and necessitates the exertion of much strength and labor. Attempts have been made to provide such loaders by utilizing conveyors wherein the baled hay may be picked up and positioned on a vehicle such as a truck or the like. These devices are normally attached alongside the vehicle and discharge the bales over the load carrying area thereof. However, after the bales have been transported to a storage area, it is necessary to unload such bales by hand. Accordingly, it is the primary object of the present invention to provide a loading and unloading attachment for a tractor whereby bales may be picked up from the field and positioned on a trailing wagon hitched behind the tractor and then transported to the storage area with the loading attachment still on the tractor whereby the loading device may be rearranged and adjusted in relation to the tractor for unloading the baled hay and transporting the same to a barn loft or other elevated position with a minimum of effort and time expended.

Another object of the present invention is to provide a loading and unloading attachment for tractors wherein the device is driven from a power take-off of the tractor and the attachment is adjusted from a loading position to an unloading position by utilization of the lift arms normally found on certain types of tractors.

A further object of the present invention is to provide a baled hay loading and unloading attachment for tractors wherein a chain-type conveyor is utilized for moving the baled hay along the conveyor frame and sweeparms are provided for guiding the baled hay into the conveyor.

Still another important object of the present invention is to provide a baled hay loading and unloading attachment in conformance with the preceding objects which includes an elongated conveyor portion and a relatively short independent conveyor portion that is pivotal in relation to the main conveyor portion for enhancing the utility and versatility of the loading and unloading attachment.

Other important objects of the present invention will reside in its simplicity of construction, ruggedness and dependability, efficiency of operation, labor saving characteristics, time saving characteristics, its adaptation for its various purposes and its relatively inexpensive manufacturing and maintenance cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the baled hay loading and unloading attachment secured to a tractor in operative position and showing dotted line positions for unloading the trailing wagon hitched behind the tractor;

Figure 2 is a top plan view of the construction of Figure 1 showing the relationship of the chain conveyors and other structural details thereof;

Figure 3 is a fragmental, vertical sectional view taken substantially upon a plane passing along section line 3—3 of Figure 2 showing the details of the mounting structure for the rear end of the conveyor together with the driving means therefor;

Figure 4 is a transverse, vertical sectional view taken substantially upon a plane passing along section line 4—4 of Figure 3 showing the upper end of the pivotal support for the rear portion of the conveyor and the position of the driving and driven sprockets for driving the conveyor chain;

Figure 5 is a vertical sectional view taken substantially upon a plane passing along section line 5—5 of Figure 1 showing the construction of the guide rods for guiding vertical swinging movement of the conveyor;

Figure 6 is a fragmental detailed view showing the pivotal or latch means for retaining the conveyor in elevated position with the latch means being disposed in an operative position; and Figure 7 is a view similar to Figure 6 showing the conveyor in elevated position and showing the latch in operative position.

Referring now specifically to the drawings, it will be seen that the numeral 10 generally designates the loading and unloading attachment of the present invention for attachment to a tractor 12 that is provided with a trailing vehicle generally designated by the numeral 14 in the nature of a wagon or the like. The tractor 12 includes the usual ground engaging wheels 16, steering wheels 18, drawbar 20, power take-off 22, and pivotal lift arms 24, all of which may be controlled in the usual manner. Further, it will be seen that the wagon 14 is in the nature of a trailer and is attached to the drawbar 20 by any suitable means.

Referring now specifically to Figures 1 and 2 of the drawings, it will be seen that the attachment 10 includes an elongated conveyor frame member 26 including a central longitudinal plate 28 having upstanding side walls 30 thereon and depending side walls 32 formed rigidly therewith. On the upper surface of the side walls 30 is provided guide rods 34 for retaining hay bales 36 on the upper surface of the central plate 28. At the forward end of the frame 26 is provided projecting arms 38 rotatably supporting a transverse shaft 40 having a sprocket gear 42 positioned centrally thereof. At the rear end of the frame 26 is provided a pair of projecting arms 44 having a shaft 46 rotatably journaled therebetween and including a sprocket gear 48 on the center thereof in alignment with the sprocket gear 42 for receiving an encircling conveyor chain 50 having a plurality of longitudinally spaced upstanding lugs 52 thereon for engaging and carrying the hay bale 36 along the conveyor frame 26. It will be seen that the chain 50 will normally rest against the upper surface of the central plate 28 during the movement upwardly of the inclined plate 28 and will be spaced therebelow during the return movement and the operator of the tractor 12 is protected from contact with the return chain 50 by a trough 33 interconnecting side walls 32.

Pivotally attached to the outer ends of the arms 44 is a relatively short conveyor frame 54 having a central plate 56 together with a protective trough 57 spaced therebelow and upstanding guide rods 58 thereon together with a shaft 60 rotatably journaled in the end thereof remote from the shaft 46. A pair of sprocket gears 62 are secured to the shaft 46 for rotation therewith and a pair of sprocket gears 64 are attached to the rotatable shaft 60 in alignment with gears 62 for receiving a pair of encircling conveyor chains 66 having upstanding lugs 70 thereon whereby the conveyor chains 66 will be driven by the shaft 46 as well as the conveyor chain 50.

Extending downwardly and rearwardly at each forward edge of the conveyor frame 26 is a foot member 72 that is braced by a brace member 74 for engaging the ground surface whereby the front end of the conveyor frame 26 will be moved over the ground surface with the skids of feet 72 forming a support therefor. Projecting forwardly of the front end of the frame 26 is a pair of diverging guide members or gathering members 76 of circular frame-like construction which are adapted to engage a bale of hay 36 for arranging the hay bale 36 in longitudinal relation for engagement by the lugs 52 on the chain 50 for bringing the hay bale 36 onto the conveyor frame 26. Also, the rotatable rod 40 may be provided with projections 78 for urging the hay bales 36 onto the conveyor frame 26.

Referring now specifically to Figures 3 and 4 of the drawings, it will be seen that a pair of depending brackets 78 are provided on the central plate 28 at each edge thereof adjacent the rear end and spaced rearwardly of the depending flanges 32 and trough 33. These depending brackets 78 terminate in bearing sleeves 80 receiving a transverse rod 82 that terminates in a pair of depending supporting rods 84 which are terminally attached to the drawbar and braces 86 and 88 retain the support rods 84 in vertical position. The support rods 84 together with the transverse rod 82 forms substantially an inverted U-shaped support for pivotally supporting the conveyor frame 26 at the upper end thereof. A sleeve 90 is secured to the rod 82 by a transverse pin 92 for retaining the conveyor frame 26 in predetermined position on the rod 82. Disposed between the bearing sleeves 80 is a pair of sprocket gears 96 and 97. The sprocket gear 96 is provided with a sprocket chain 98 which also encircles a gear 100 mounted on the rotatable shaft 46. An idler sprocket gear 102 is in engagement with the sprocket chain 98 and is spring loaded in order to retain the sprocket chain 98 in taut condition whereby the rotatable shaft 46 may be driven by the sprocket chain 98. The sprocket gear 97 is engaged by an encircling sprocket chain 104 that passes over a sprocket gear 106 on the power take-off 22 of the tractor 12 whereby the conveyor chain 50 as well as the conveyor chain 66 will be driven from the power take-off 22 of the tractor 12. It will be understood that the conveyor frame 26 may pivot about a horizontal axis formed by the rod 82 without the chains 104 and 98 being disturbed since the chains 98 and 104 will retain their relationship. An elongated telescopic brace 108 extends from the support rods 84 and is adjustably secured thereto by spaced apertures 110 and a fastening bolt 112 and the brace 18 is attached to the conveyor frame 54 for retaining the conveyor frame 54 in adjusted angular relationship to the conveyor frame 26.

Positioned forwardly of the brackets 78 is a pair of mounting lugs 114 connected to an elongated link 116 that is pivotally connected at its other end to the lift arm 24 whereby actuation of the lift arms 24 will raise and lower the front end of the conveyor frame 26 about the axis formed by the horizontal rod 82. In order to reverse movement of the conveyor chains 50 and 66, it is only necessary to reverse the power take-off 22 or to change the gear arrangement therein so that the chain 104 will be moved in an opposite direction.

Referring now specifically to Figures 5-7 as well as a portion of Figure 1, it will be seen that the front end of the tractor 12 is provided with a pair of projecting frame members 118 terminating in a transverse and rearwardly facing channel iron member 120 that has a pair of elongated vertical guide rods 122 extending through the legs thereof and secured thereto by suitable welding 124. On the rear surface of each of the vertical rods 122 is a lug 126 for attaching one end of a tension coil spring 128 that has its other end attached to a right angular member 130 on the undersurface of the plate 28 at this portion of the conveyor frame 26. The tension coil spring 128 will tend to resiliently urge the conveyor frame 26 toward the ground surface so that the ground engaging sliding feet 72 will be retained in contact with the ground surface. When it is desired to raise the front end of the conveyor 26, the springs 128 may be detached to eliminate excessive stretching thereof. Also, it will be understood that these springs 128 may be completely omitted depending upon the terrain from which the baled hay is being gathered.

Adjacent the upper end of each of the rods 122 which is flared as indicated by the numeral 132, is a pivotal latch member 134 that is generally right angular in configuration and is attached to the bar 122 by a pivot pin 136. A stop member 138 is provided on the outer edge of the rods 122 and spaced below the pivot pin 136 so that the latch 134 may be moved to an inoperative position as illustrated in Figure 6 wherein the L-shaped portion or right angular portion of the latch 134 projects exteriorly of the bars 122 thereby permitting the conveyor frame 26 to move upwardly therethrough. After the conveyor frame 26 has moved upwardly, the latch 134 may be pivoted about pin 136 to an operative position as illustrated in Figure 7 whereby the L-shaped portion of the latch 134 will be positioned under the conveyor frame 26 and engage the undersurface of the central plate 28 and the upstanding edge 30 for rigidly supporting and positively supporting the conveyor frame in elevated position during the unloading operation thereof and during movement from the field to the barn.

In practical operation, the hay bales 36 are picked off the ground surface and moved up the incline of the conveyor frame 26 by the conveyor chain 50 and downwardly along the conveyor frame 54 onto the wagon 14. When the wagon 14 is full, the entire apparatus is moved to a storage area such as a barn wherein it is desired to elevate the baled hay into the barn loft. When this is desired, the frame 26 is moved upwardly by manipulating the lift arms 24 whereby the frame 26 will assume the position shown in dotted line in Figure 1 dependent upon the necessity for raising the front end of the conveyor the desired height. The moving direction of the conveyor chains 50 and 66 may then be reversed by reversing the power take-off or changing the gearing therein so that the hay bales 36 may be unloaded into the desired area. Obviously, the device may be constructed of any suitable material and may be used for conveying other materials in any manner desired.

It will be seen that the protective trough provides adequate protection from the conveyor chains 50 and 66 and the chains 66 will not contact the hay bales on the wagon when the device is used in unloading. Also, the brackets 134 may be omitted and a single U-shaped member may be positioned between members 122 in underlying relation to the frame 28 for securely supporting the frame in elevated position while driving the tractor to and from the field. Also, the device may be quickly and easily assembled onto the tractor and removed therefrom. It also will be understood that the device may be used in loading and unloading various types of material and articles with very little modification.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and

What is claimed as new is as follows:

1. A baled hay loading and unloading attachment for a tractor having a drawbar, a reversible power take-off, and lift arms at the rear thereof, said attachment comprising an elongated conveyor frame mounted longitudinally over the tractor, a support pivotally interconnecting the rear end of the conveyor frame and the drawbar, an endless chain conveyor on said frame, means interconnecting said conveyor and the power take-off, means at the forward end for slidingly engaging the ground surface, and means interconnecting the lift arms and the conveyor frame for raising and lowering the frame whereby the conveyor may selectively load and unload a trailing wagon hitched behind the tractor, a pair of vertically extending guide rods adapted to be attached to the front of the tractor for engaging opposite sides of the conveyor frame for guiding the vertical swinging movement thereof, detachable spring means interconnecting the conveyor frame and the front of the tractor for retaining the ground engaging end of the frame in contact with the ground, and pivotal latch means adjacent the upper end of each of said guide rods for engagement under the conveyor frame for holding the front end of the frame elevated for unloading a trailing wagon, said chain conveyor passing over rotatable sprocket gears at each end of said frame, said frame including longitudinal side rails for retaining baled hay thereon, said elevated end of said conveyor frame having an extension pivotally attached thereto, an adjustable brace interconnecting said extension and said support for retaining said extension in adjusted position, an independent chain conveyor on said extension, said independent chain conveyor being driven by said driving means.

2. A baled hay loading and unloading attachment for a tractor having a drawbar, a reversible power take-off, and lift arms at the rear thereof, said attachment comprising an elongated conveyor frame mounted longitudinally over the tractor, a support pivotally interconnecting the rear end of the conveyor frame and the drawbar, an endless chain conveyor on said frame, means interconnecting said conveyor and the power take-off, means at the forward end for slidingly engaging the ground surface, and means interconnecting the lift arms and the conveyor frame for raising and lowering the frame whereby the conveyor may selectively load and unload a trailing wagon hitched behind the tractor, a pair of vertically extending guide rods adapted to be attached to the front of the tractor for engaging opposite sides of the conveyor frame for guiding the vertical swinging movement thereof, detachable spring means interconnecting the conveyor frame and the front of the tractor for retaining the ground engaging end of the frame in contact with the ground, and pivotal latch means adjacent the upper end of each of said guide rods for engagement under the conveyor frame for holding the front end of the frame elevated for transporting of the same and for unloading a trailing wagon, said chain conveyor passing over rotatable sprocket gears at each end of said frame, said frame including longitudinal side rails for retaining baled hay thereon, said ground engaging end of said conveyor frame having forwardly extending and diverging guide bars for guiding bales of hay onto said conveyor.

3. An attachment for a tractor having a power take-off, and lift arms adjacent the rear thereof, said attachment comprising an elongated frame mounted longitudinally above the tractor and extending beyond the front of the tractor, rigid upwardly extending support means attached to the tractor adjacent the rear thereof, the upper end of said support means being pivotally connected to the elongated frame for permitting vertical swinging movement of the frame, an endless conveyor means mounted on said frame, means for interconnecting the power take-off and said conveyor means for driving the conveyor means, means at the front end of the frame for supporting the same from the ground surface whereby bales of hay resting upon the ground surface may be picked up by the conveyor means and conveyed rearwardly and upwardly to load the bales onto a trailing vehicle, and link means for interconnecting the lift arms and the frame in longitudinally spaced relation to the pivotal connection between the frame and the support means whereby swinging movement of the lift arms will cause vertical swinging movement of the frame for elevating the front end of the frame and conveyor means thereon to an elevated position whereby a load of baled hay on a trailing vehicle may be unloaded into an elevated storage area and whereby the frame may be elevated to a generally horizontal position for storage thereof.

References Cited in the file of this patent

UNITED STATES PATENTS

| 2,427,324 | Farr et al. | Sept. 9, 1947 |
| 2,594,221 | Ryan | Apr. 22, 1952 |

FOREIGN PATENTS

| 572,019 | Great Britain | Sept. 19, 1945 |
| 479,168 | Canada | Dec. 11, 1951 |
| 84,190 | Norway | Mar. 6, 1953 |
| 154,033 | Australia | Nov. 9, 1953 |